(12) United States Patent
Gehring

(10) Patent No.: US 7,352,078 B2
(45) Date of Patent: Apr. 1, 2008

(54) OFFSHORE POWER GENERATOR WITH CURRENT, WAVE OR ALTERNATIVE GENERATORS

(76) Inventor: Donald Hollis Gehring, 14690 Old Conroe Rd., Conroe, TX (US) 77384

(*) Notice: Subject to any disclaimer, the term of this patent is extended or adjusted under 35 U.S.C. 154(b) by 0 days.

(21) Appl. No.: 11/194,969

(22) Filed: Aug. 2, 2005

(65) Prior Publication Data

US 2006/0261597 A1 Nov. 23, 2006

Related U.S. Application Data

(63) Continuation-in-part of application No. 11/132,489, filed on May 19, 2005, and a continuation-in-part of application No. 11/142,145, filed on Jun. 1, 2005.

(51) Int. Cl.
*F03B 13/00* (2006.01)
(52) U.S. Cl. ...................................... 290/54
(58) Field of Classification Search ............... 290/54
See application file for complete search history.

(56) References Cited

U.S. PATENT DOCUMENTS

| | | | | |
|---|---|---|---|---|
| 3,209,156 A | * | 9/1965 | Struble, Jr. | 290/54 |
| 3,911,287 A | * | 10/1975 | Neville | 290/53 |
| 3,946,568 A | | 3/1976 | Heien | |
| 3,986,787 A | * | 10/1976 | Mouton et al. | 415/7 |
| 4,025,220 A | | 5/1977 | Thompson et al. | |
| 4,060,344 A | * | 11/1977 | Ootsu | 417/330 |
| 4,095,422 A | * | 6/1978 | Kurakake | 60/398 |
| 4,228,360 A | * | 10/1980 | Navarro | 290/43 |
| 4,335,319 A | * | 6/1982 | Mettersheimer, Jr. | 290/54 |
| 4,613,279 A | * | 9/1986 | Corren et al. | 415/121.2 |
| 4,781,522 A | * | 11/1988 | Wolfram | 415/1 |
| 4,789,302 A | * | 12/1988 | Gruzling | 415/221 |
| 5,188,484 A | | 2/1993 | White | |
| 5,440,176 A | * | 8/1995 | Haining | 290/54 |
| 5,549,445 A | * | 8/1996 | Schremp | 415/2.1 |
| 5,573,355 A | | 11/1996 | Thomas | |
| 5,808,368 A | * | 9/1998 | Brown | 290/53 |
| 6,139,224 A | | 10/2000 | Michel et al. | |
| 6,406,251 B1 | * | 6/2002 | Vauthier | 415/7 |
| 7,012,341 B2 | * | 3/2006 | Matsubara | 290/43 |
| 7,116,005 B2 | * | 10/2006 | Corcoran, III | 290/43 |
| 2005/0285407 A1 | * | 12/2005 | Davis et al. | 290/54 |

FOREIGN PATENT DOCUMENTS

| | | | | |
|---|---|---|---|---|
| DE | 20008482 U1 | * | 9/2000 | |
| GB | 2383978 A | * | 7/2003 | |
| GB | 2416193 A | * | 1/2006 | |
| JP | 61226572 A | * | 10/1986 | |
| JP | 2002303454 A | * | 10/2002 | |
| WO | WO 2004085845 A1 | * | 10/2004 | |

\* cited by examiner

*Primary Examiner*—Joseph Waks
(74) *Attorney, Agent, or Firm*—Bracewell & Giuliani LLP

(57) ABSTRACT

An offshore power generator includes an offshore platform. Current, wind, wave and other renewable energy generators are mounted to the offshore platform. Each current generator has a shroud enclosing a set of blades. A hub member is located within the shroud and extends in an upstream direction from the blades. The flow area between the interior of the shroud and the hub member converges from the shroud inlet to the blades.

2 Claims, 16 Drawing Sheets

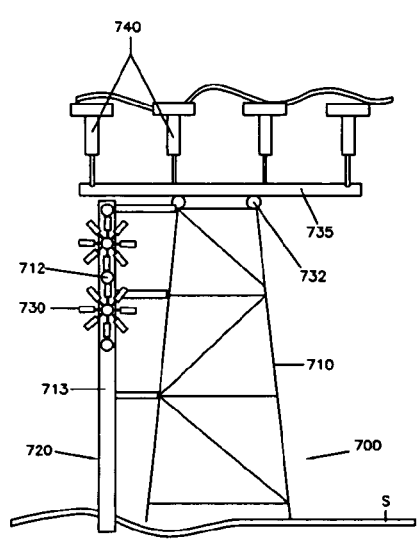 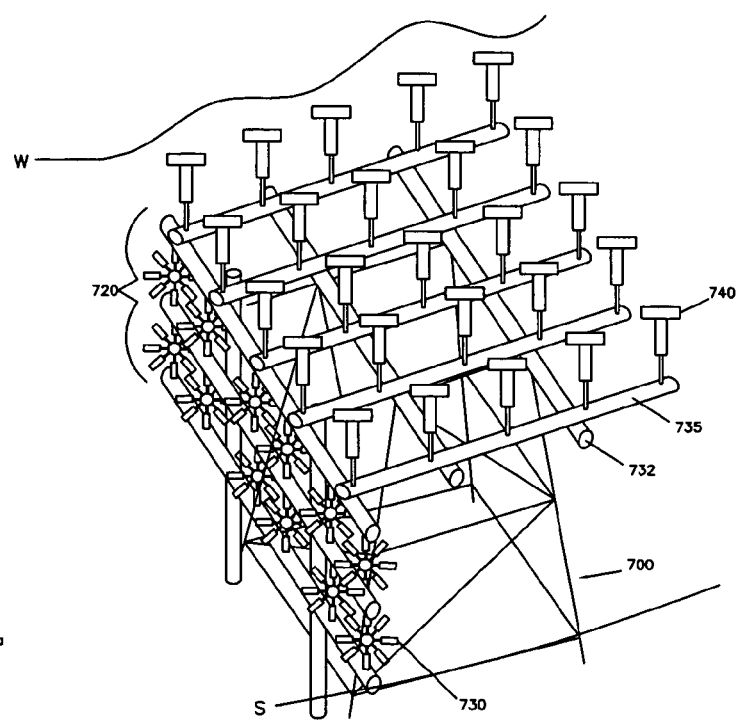
Figure 10a
Figure 10b

OFFSHORE POWER GENERATOR WITH CURRENT, WAVE OR ALTERNATIVE GENERATORS

CROSS REFERENCED TO RELATED APPLICATIONS

This application is a continuation in part of U.S. application Ser. No. 11/132,489 "Current Power Generator" filed on May 19, 2005 which is incorporated herein in its entirety. This application is also a continuation in part of U.S. application Ser. No. 11/142,145 "Ocean Wave Generator" filed Jun. 1, 2005 which is incorporated herein in its entirety.

FIELD OF THE INVENTION

The present invention relates to offshore platforms, and in particular to an offshore power generator using a new, existing, abandoned, removed, dumped or relocated fixed or floating offshore platform.

BACKGROUND OF THE INVENTION

Ordinarily, after an offshore platform has fulfilled its use by extracting all the oil or gas it can from a given location, it is merely discarded. Typically, the platforms are removed to 15 feet below the mudline. Oil companies routinely pay millions of dollars to have the platforms removed and the platforms often become the property of the remover. Many of these platforms are lowered to the seabed in approved dumping sites and are in excellent condition. As a result, the platforms could be re-used for other purposes such as power generation.

U.S. Pat. No. 3,946,568 is directed to an offshore oil production platform comprising one section disposed on the sea bed and another section connected to the one section and projecting up above the sea surface. The one section consists of a plurality of prefabricated units comprising at least one tank divided into a plurality of compartments and having a peripheral wall the thickness of which is not adapted to withstand full water pressure with the tank empty in the submerged state, and at least one compartment in the tank has a peripherial wall the thickness of which is adapted to withstand full water pressure when empty in the submerged state.

U.S. Pat. No. 5,188,484 is directed to a mobile, self-elevating, offshore production platform, for exploitation of smaller reservoirs, with a liquid tight hull having a deck; a plurality of support legs, each having a gear rack and bottom footpads, which are slidably extendable through the hull; a removable jacking tower for each support leg, and, a locking means for each support leg which is engageable to the leg gear rack at any vertical position of the leg. Mineral processing equipment is pre-installed on the deck at a suitable shoreside facility. Then the platform, with legs elevated, is towed to the offshore location where minerals are to be produced. On location the legs are lowered, grounded, and then pre-loaded to desired criteria by introducing ballast water into the hull. After pre-loading the platform is deballasted and elevated to establish a desired air gap. Upon elevation a locking device is engaged to secure each leg in place and the jacking towers, tower powering equipment, and ballast pumps may then be completely removed for storage, or reuse on other platforms. Installation is completed by connecting the hydrocarbon processing equipment to influent and effluent means provided. Upon depletion of the mineral reservoir, or for other reasons such as the threat of a violent storm, the platform can be removed from one location, and reused at another, by reversing and repeating the above procedure.

U.S. Pat. No. 6,139,224 is directed to a semi-submersible platform for offshore oil operation comprising a buoyant sub-structure comprising a base and a plurality of columns upstanding from said base, a buoyant deck-hull mounted on the columns and means for ballasting and deballasting at least the base of said sub-structure. It further comprises means for tangentially guiding said deck-hull on said columns during deployment of the platform into a predetermined configuration by ballasting of the sub-structure while the deck-hull is floating and means for locking said deck-hull to the columns in said predetermined configuration.

U.S. Pat. No. 5,573,355 is directed to an offshore oil drilling or producing platform comprising a hull carried by legs provided with feet adapted to rest on the sea bed, characterized in that the walls of each of the legs define a space opening onto the respective foot in which are retracted anchoring piles for the leg carried by the foot, each leg being also provided in its upper part with support means in vertical alignment with the piles within the space defined by the walls of the leg for supporting a device for driving the piles into the sea bed.

U.S. Pat. No. 4,025,220 is directed to a fluid-current energy-conversion plant, especially useful for electricity generation, utilizing an axial flow turbine as the energy conversion element, has self-inflated flexible collector elements for capturing a portion of the fluid current, increasing its velocity, guiding at least some of each portion into the turbine's mouth, then returning the captured flow into the stream.

None of the above inventions provide a re-usable offshore oil platform to provide an alternative energy source. It would therefore be beneficial if an alternative energy source utilizing the re-use of decommissioned oil platforms existed to harness energy.

SUMMARY OF THE INVENTION

It is an aspect of the present invention to provide an offshore power generator utilizing a new, existing, abandoned, removed, dumped, or relocated offshore platforms.

It is a further aspect of the present invention to provide an offshore power generator that includes an offshore platform; a support frame mounted to the offshore platform comprising vertical support members and horizontal support members; current generators mounted to the horizontal support members of the support frame; and power cables, in electrical communication with the current generators.

It is yet a further aspect of the present invention to provide an offshore power generator that includes an offshore platform; a support frame mounted to the offshore platform comprising vertical support members and horizontal support members; current generators mounted to the horizontal support members of the support frame; cross support beams mounted to the top of the offshore platform; wave generators mounted to the top of the cross support beams; and power cables, in electrical communication with the current generators and the wave generators.

In accordance with a first aspect of the present invention, a novel offshore power generator is provided. The novel offshore power generator includes an offshore platform; current generators mounted to the offshore platform; and power cables, in electrical communication with the current generators.

In accordance with a further aspect of the present invention, an alternative embodiment of a novel offshore power generator is provided. The novel offshore power generator includes an offshore platform; a support frame mounted to the offshore platform comprising vertical support members and horizontal support members; current generators mounted to the horizontal support members of the support frame; and power cables, in electrical communication with the current generators.

In accordance with yet a further aspect of the present invention, a novel offshore power generator is provided including wave generators. The novel offshore power generator includes an offshore platform; a support frame mounted to the offshore platform comprising vertical support members and horizontal support members; current generators mounted to the horizontal support members of the support frame; cross support beams mounted to the top of the offshore platform; wave generators mounted to the top of the cross support beams; and power cables, in electrical communication with the current generators and the wave generators.

BRIEF DESCRIPTION OF THE DRAWINGS

The foregoing summary, as well as the following detailed description of a preferred embodiment of the present invention will be better understood when read with reference to the appended drawings, wherein:

FIG. 10a is a side elevation view of an offshore power generator of the present invention having a series of wave generators on the top of the generator.

FIG. 10b is a perspective view of the offshore power generator of FIG. 10a.

DETAILED DESCRIPTION OF THE PREFERRED EMBODIMENTS

Figure 1:
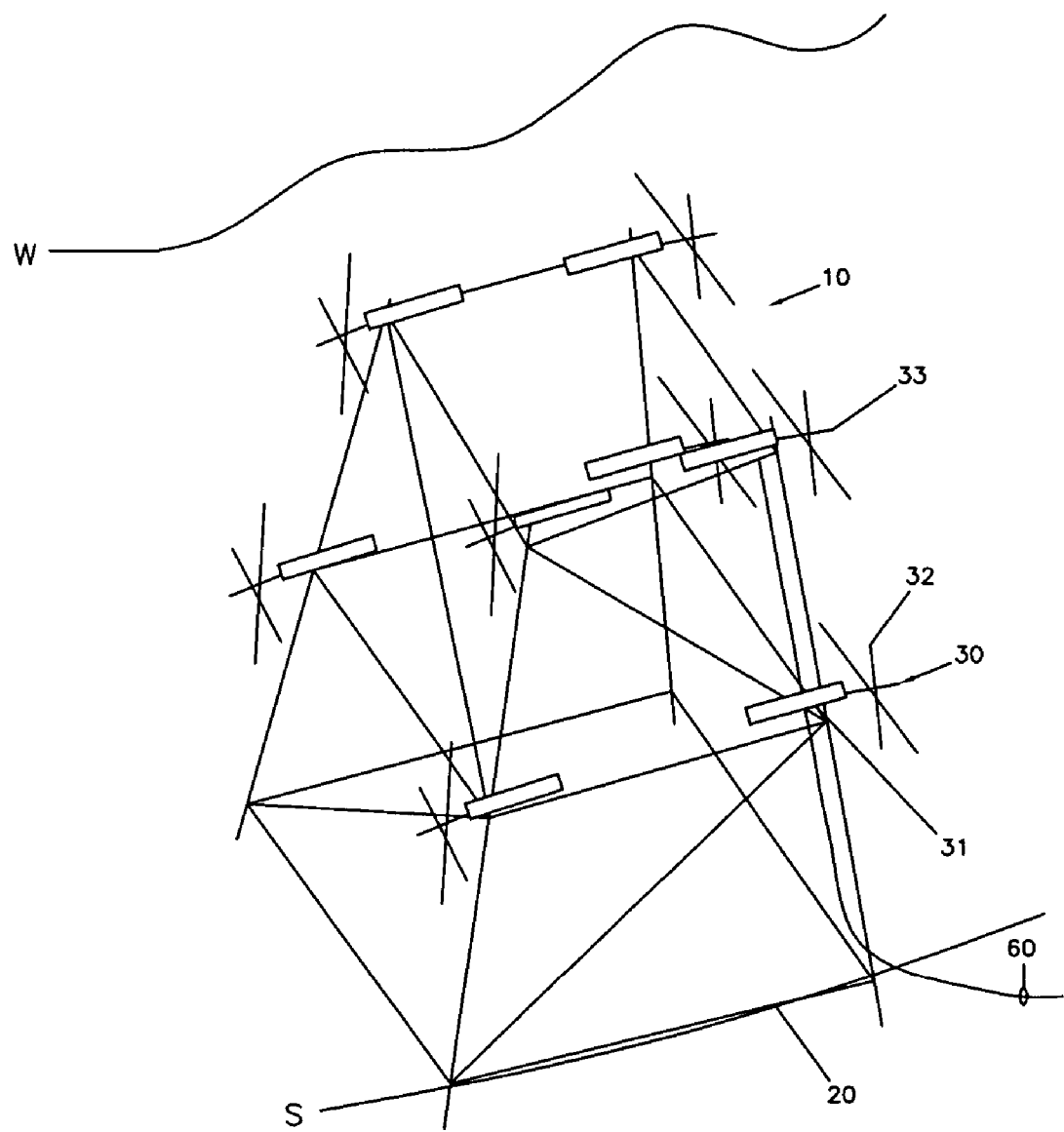
FIG. 1 is a perspective view of an offshore power generator in accordance with the present invention.
Figure 2:
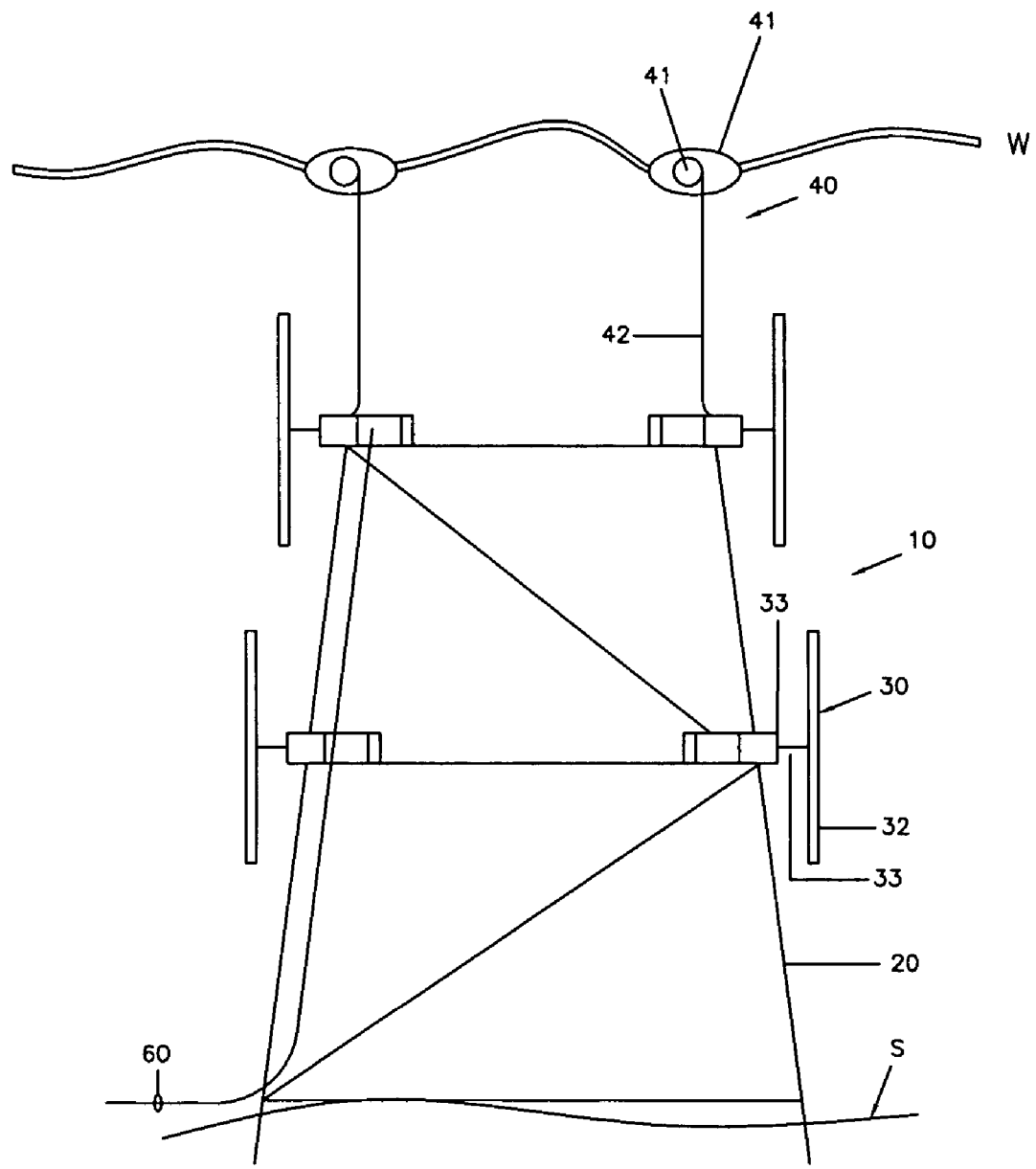
FIG. 2 is a side elevation view of an offshore power generator in accordance with the present invention including wave generators.
Figure 3:
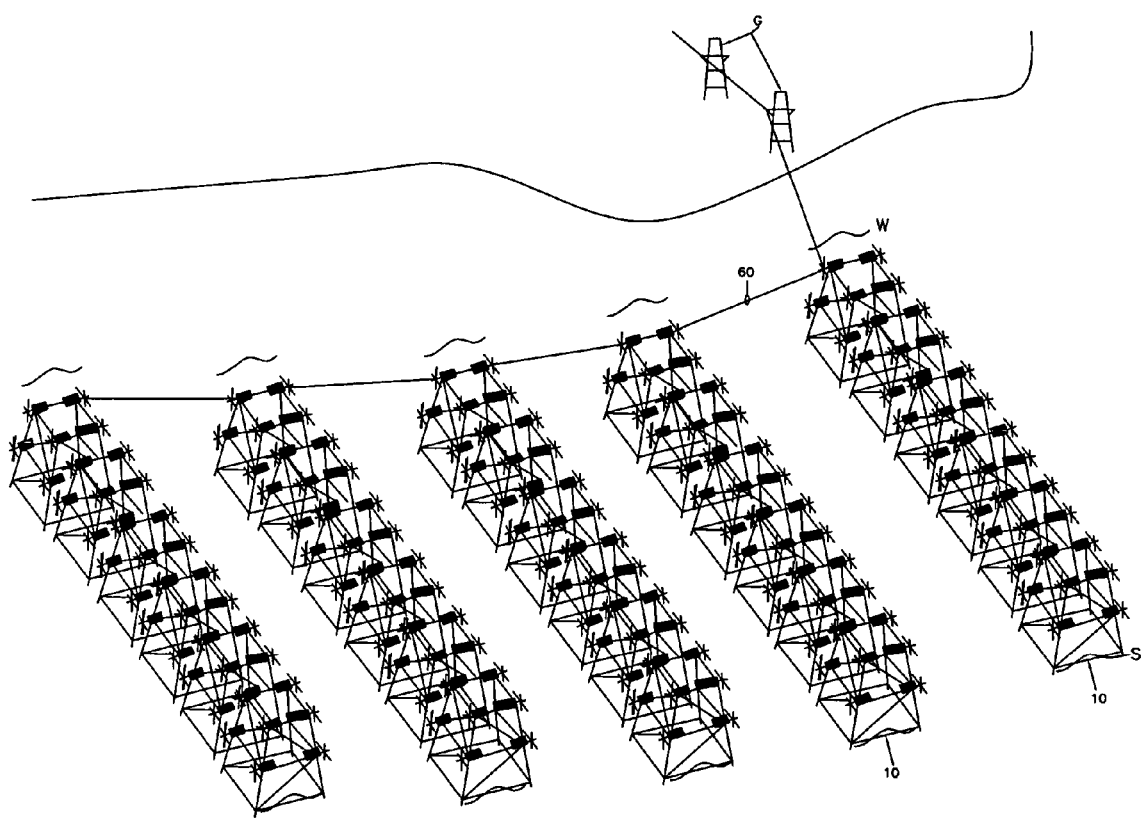
FIG. 3 is a schematic view of a plurality of the offshore power generators of FIG. 1 shown interconnected and to a landside power grid.

Referring now to the drawings, wherein like reference numerals refer to the same components across the several views and in particular to FIGS. 1, 2, and 3, there is shown an offshore power generator 10. The offshore power generator 10 includes an offshore platform 20 and current generators 30.

The offshore platform 20 rests on the seabed S and has mounted on it a plurality of generators 30. Each current generator 30 in this embodiment of the present invention includes a generator 31, a shaft 33 rotatably mounted within and protruding out of the generator 31, and a plurality of blades 32 mounted to the shaft 33 to turn the shaft 33 in response to water current flow. Electrically connected to the current generators 30 are power cables 60. The power cables 60 transmit the energy generated by the current generators 30 for consumption. For example, the power cables 60 may be connected to a power grid G, located onshore.

Referring now to FIG. 2, the offshore power generator 10 includes an additional wave generator 40 mounted at the top of the offshore platform 20. The wave generators 40 include a buoy 41, an anchor leg 42, and a generator 43 which is operatively connected to the anchor leg 42. When the buoy 41 rises during a wave crest, the anchor leg 42 turns the generator 43 to generate electricity.

FIG. 3 depicts a typical arrangement of a power generation station utilizing a plurality of the offshore power generators 10. The offshore power generators 10 are connected via underwater power cables 60 to one another and can be connected over underwater power cable bridges to an onshore power grid G. The onshore power grid G can transmit the energy generated by the offshore power generators 10 for a variety of uses.

Figure 4:
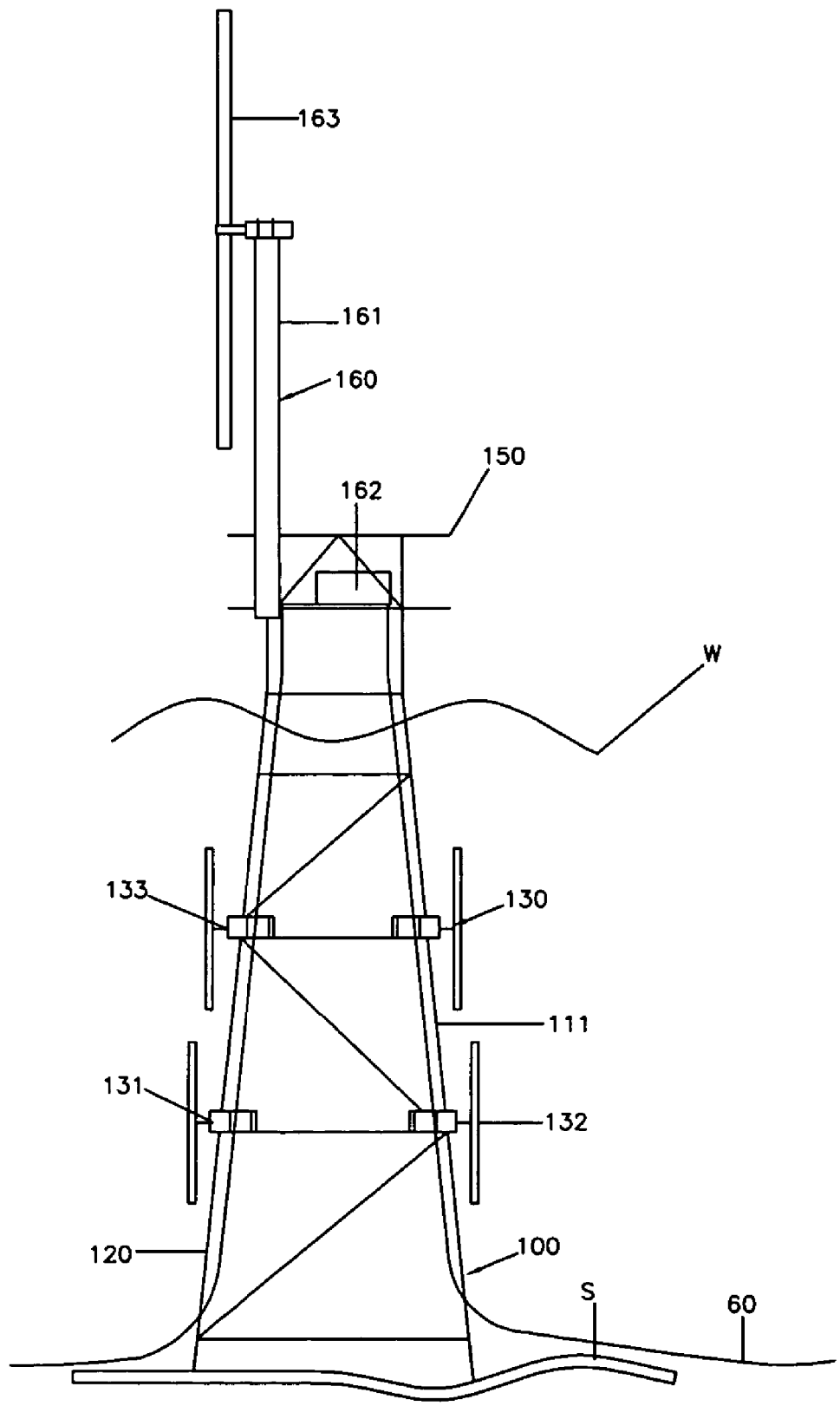
FIG. 4 is a side elevation view of an alternative embodiment of an offshore power generator having a surface mounted generator.

Referring now to FIG. 4, an alternative embodiment of an offshore power generator 100 is depicted. The offshore power generator 100 includes current generators 130 under the surface W of the ocean. The current generators 130 are mounted to an offshore platform 120. Each current generator 130 in this embodiment of the present invention is substantially similar structurally and in operation to the current generators 30. Each current generator 130 is electrically connected to an external control center 162, and in turn to power cables 60. The power cables 60 transmit the energy generated by the current generators 130 and 162 for consumption. For example, the power cables 60 may be connected to the power grid G, located onshore.

The offshore power generator 100 in this embodiment also includes an above the water platform 150. Mounted to the top of the platform 150 is a wind generator 160. The wind generator 160 includes a shaft 161, a generator portion 162, and a windmill 163.

Figure 5:
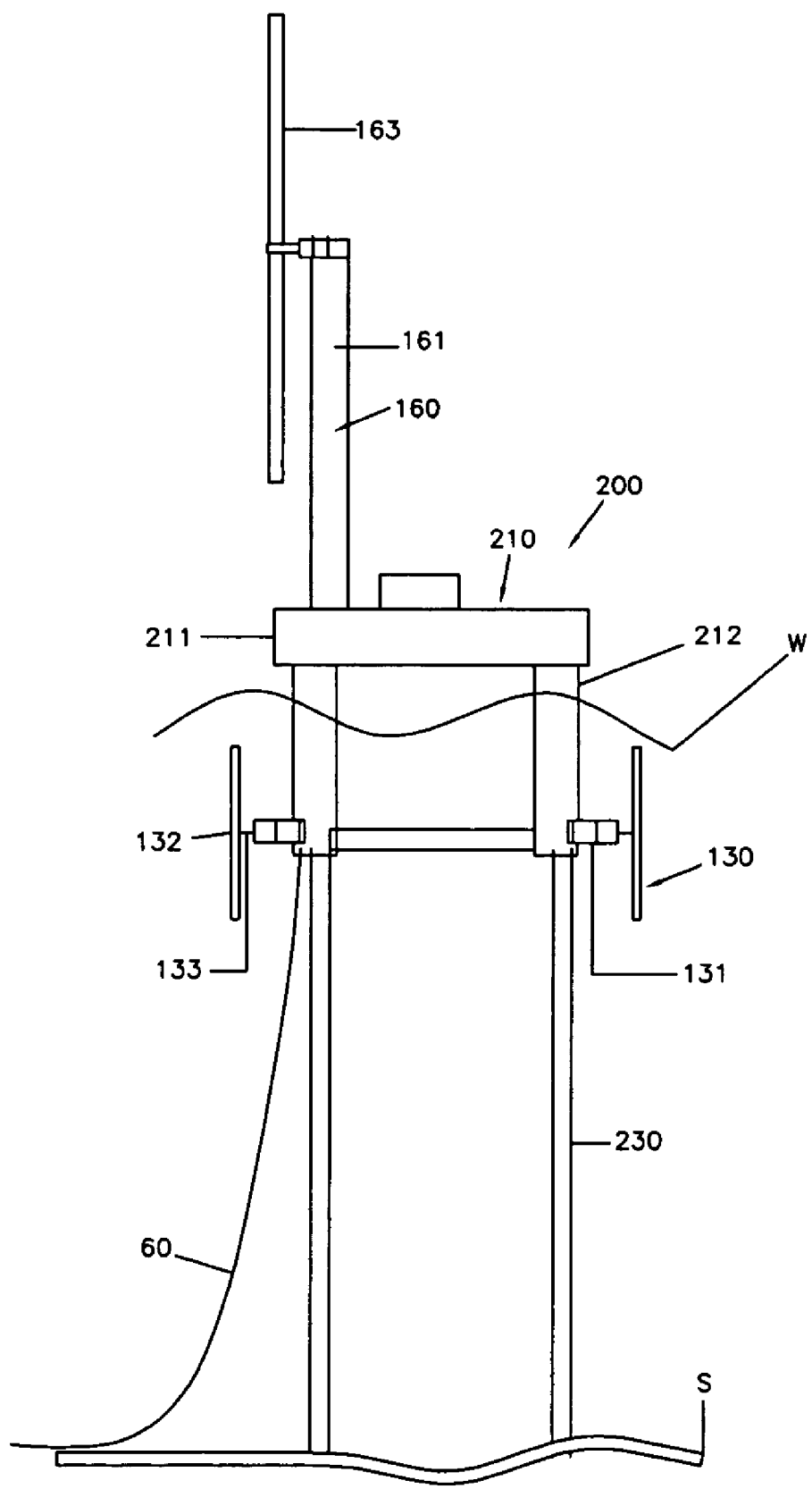
FIG. 5 is a side elevation view of a floating offshore power generator.

Referring now to FIG. 5, an alternative embodiment of an offshore power generator 200 is depicted. The offshore power generator 200 includes a floating platform 210 having a surface portion 211 and a submerged portion 212. Mounted to the surface portion 211 of the floating platform 210 is the wind generator 160, which includes a shaft 161, and a generator portion 163. In this embodiment, the current generators 130 are mounted to the submerged portion 212 of the offshore power generator 200. As described in FIG. 1, the current generators 130 are substantially similar structurally and in operation to the current generators 30. Each current generator 130 and wind generator 160 are electrically connected to the electrical control center 162, and in turn to power cables 60. The power cables 60 transmit the energy generated by the current generators 130 and 160 for consumption. For example, the power cables 60 may be connected to the power grid G, located onshore.

The floating platform 210 is moored to the seabed S by mooring cables 230. In a preferred embodiment of the present invention, the mooring cables 230 are connected to the submerged portion 212 of the floating platform 210. However, it is possible that the mooring cables 230 could be connected to the surface portion 211.

Figure 6:
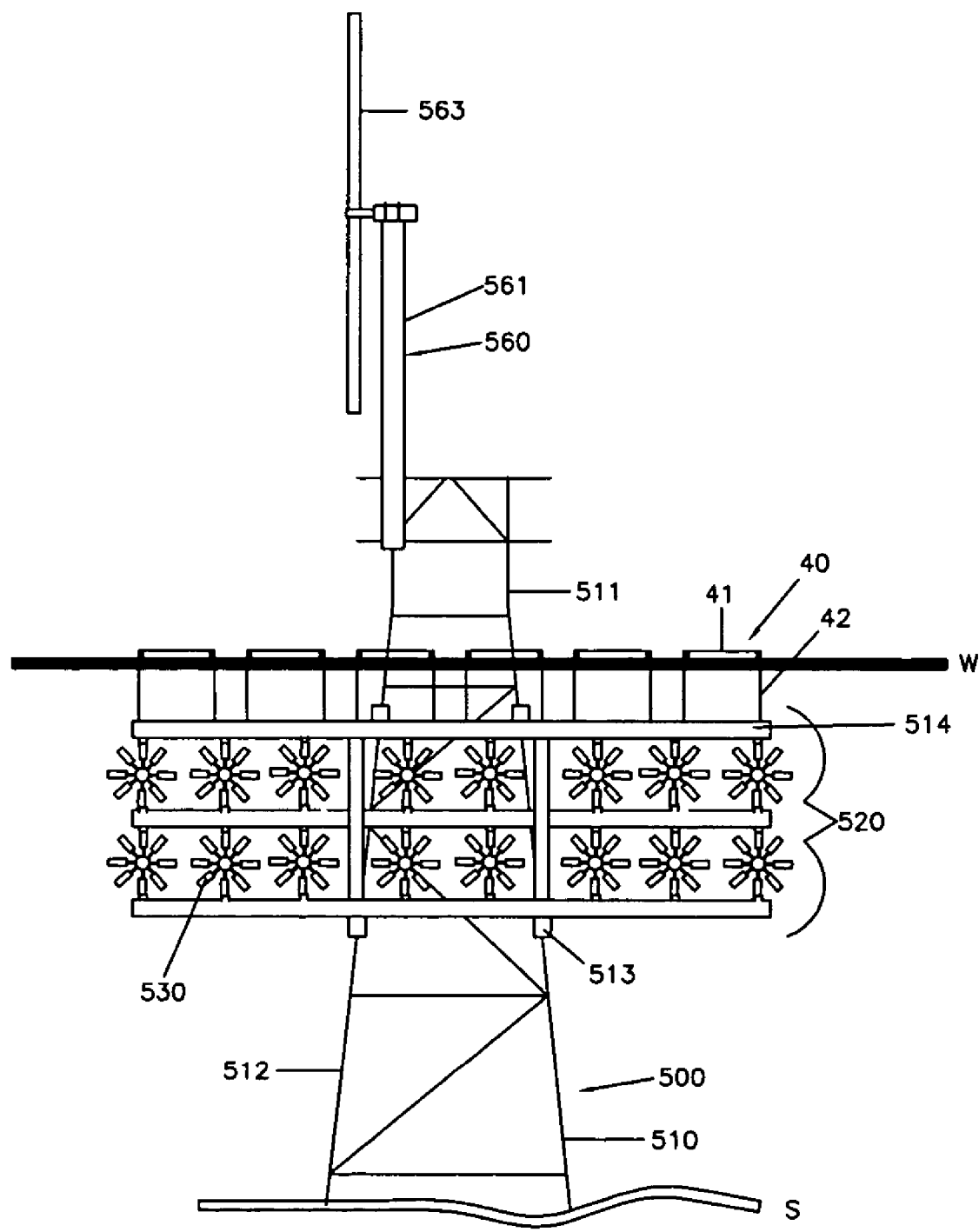
FIG. 6 is a side elevation view of an alternative embodiment of an offshore power generator.

Referring now to FIG. 6, another embodiment of an offshore power generator is shown. The offshore power generator 500 includes an offshore platform 510, which has a surface portion 511 and a submerged portion 512. A current generator frame 520 is mounted to the submerged portion 512 of the offshore power generator 500. The current generator frame 520 includes vertical support members 513 and horizontal support members 514. Current generators 530 are mounted to the horizontal support members to generate electricity in response to water current flow. The current generators 530 are substantially similar in structure and operation to the current generators 30 described in FIG. 1. Mounted to the surface portion 511 of the offshore platform 510 is a wind generator 560, which includes a shaft 561, and a windmill 563. In a preferred embodiment of the present invention, the windmill 563 turns a generator (not shown) in response to air current. Power cables (not shown) can be electrically connected to any combination of the current generators 530, or wind generators 560. The current generators 530 and the wind generator 560 generate power independently of each another and transfer power via the power cables for consumption. The wave generators 40 are substantially similar in structure and operation to the wave generators 40 described in FIG. 2.

Figure 7:
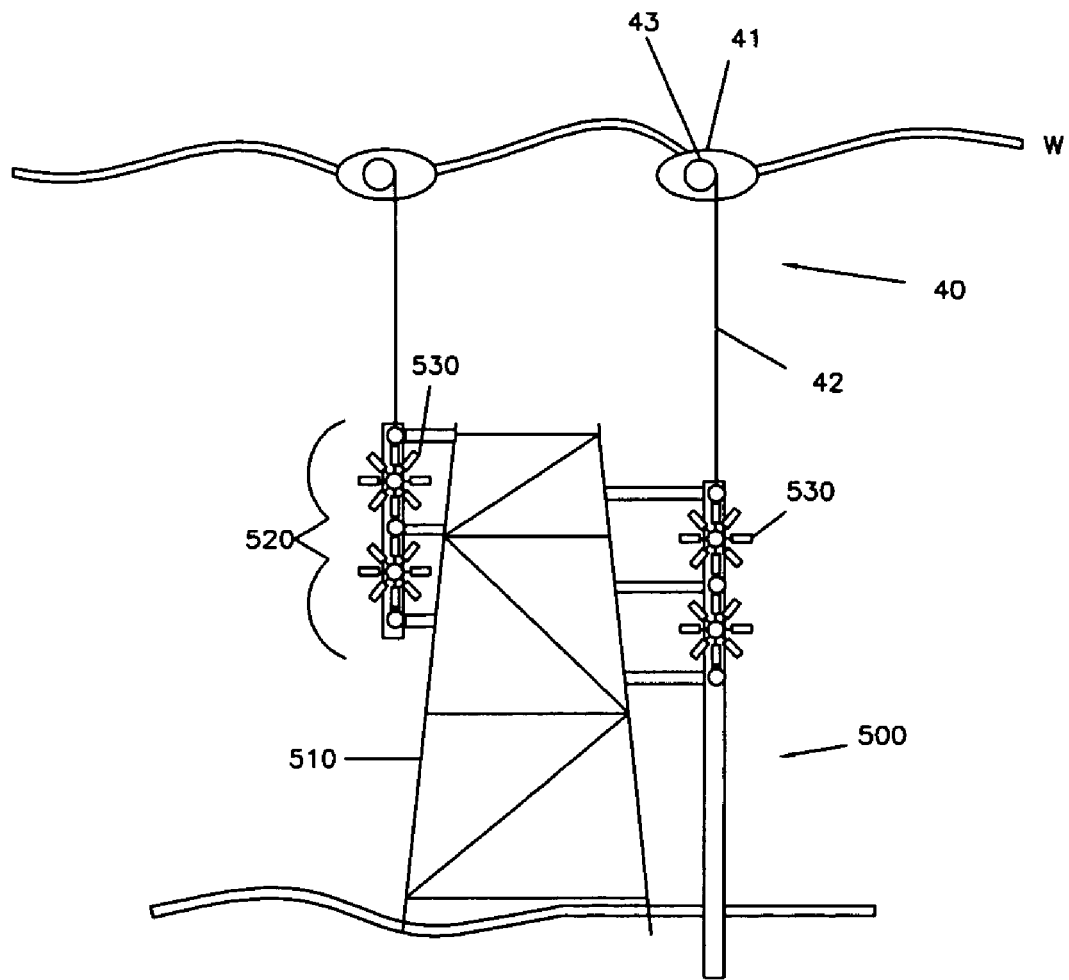
FIG. 7 is a side elevation view of an alternative embodiment of an offshore power generator in accordance with the present invention.

Referring now to FIG. 7, another embodiment of an offshore power generator 500 is shown. The offshore power generator 500 includes an offshore platform 510, and a current generator frame 520 which is mounted to the offshore platform 510. The current generator frame 520 includes vertical support members 513 and horizontal support members 514. Current generators 530 are mounted to the horizontal support members to generate electricity in response to water current flow. The current generators 530 are substantially similar in structure and operation to the current generators 30 described in FIG. 1. Power cables (not shown) can be electrically connected to the current generators 530 and transfer the power via the power cables for consumption. Since this embodiment has nothing above the water's surface, it has no visual pollution from shore. All components of this embodiment can also be recessed far enough below the water's surface to allow boat traffic above. The wave generators 40 are substantially similar in structure and operation to the wave generators 40 described in FIG. 2.

Figure 8:
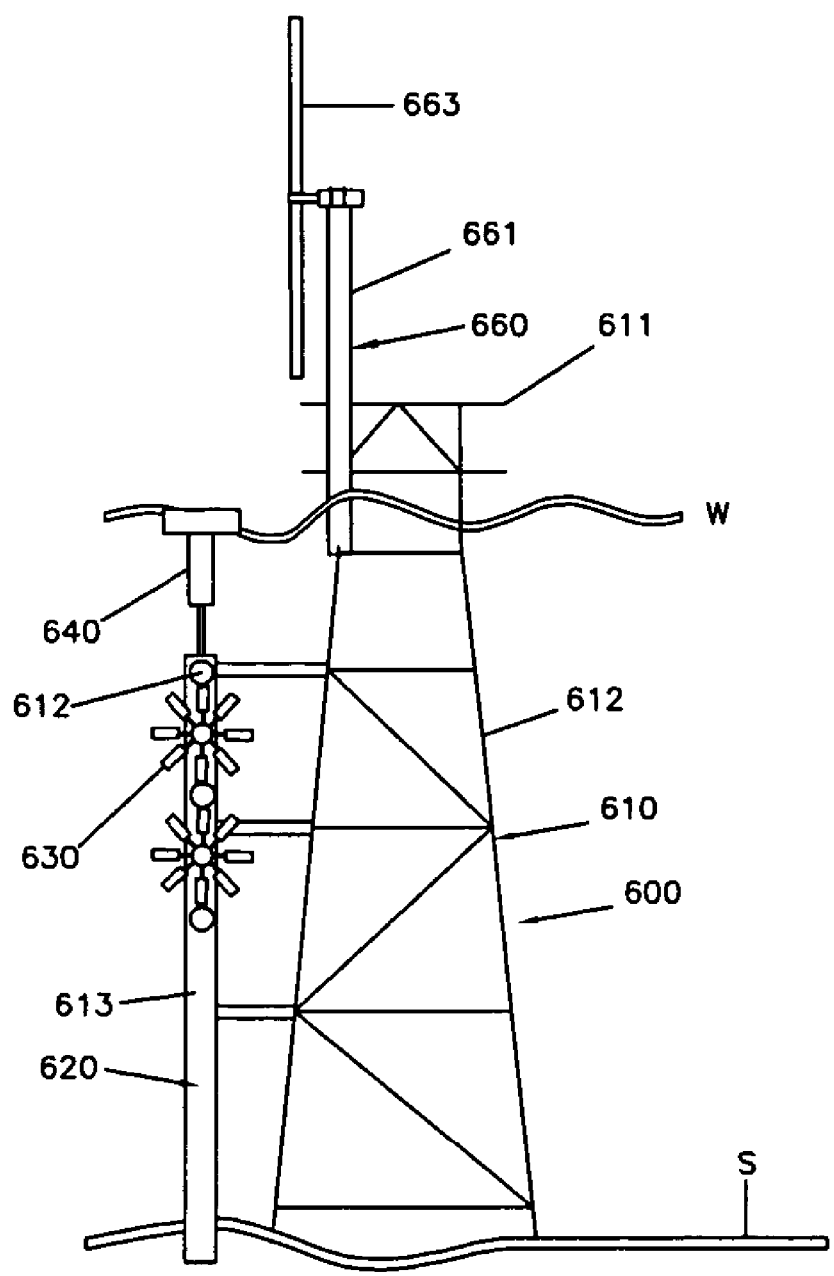
FIG. 8 is a side elevation of an alternative embodiment of an offshore power generator having an alternative energy generator on a surface platform and wave generators.

Referring now to FIG. 8, an alternative embodiment of an offshore power generator 600 is depicted. The offshore power generator 600 includes an offshore platform 610, which has a surface portion 611 and a submerged portion 612. The offshore platform 610 is mounted to the seabed S. A current generator frame 620 is mounted to the submerged portion 612 of the offshore power generator 600. The current generator frame 620 includes vertical support members 613 and horizontal support members 612. Current generators 630 are mounted to the horizontal support members to generate electricity in response to water current flow. The current generators 630 are substantially similar in structure and operation to the current generators 30 described in FIG. 1. Mounted to the surface portion 611 of the floating platform 610 is a wind generator 660, which includes a shaft 661, and a windmill 663. In a preferred embodiment of the present invention, the windmill 663 turns a generator (not shown) in response to air current. Wave generators 640 are mounted to the topmost horizontal support member 612 of the support frame 620 to generate electricity from the rising and falling of waves. The wave generators 640 are substantially similar in structure and operation to the wave generators 40 described in FIG. 2. Power cables (not shown) can be electrically connected to any combination of the current generators 630, the wave generators 640, or the wind generator 660. For example, the current generators 630, wave generators 640, and the wind generator 660 can generate power independently of one another or in any combination with one another to be transferred via the power cables for consumption.

Figure 9:
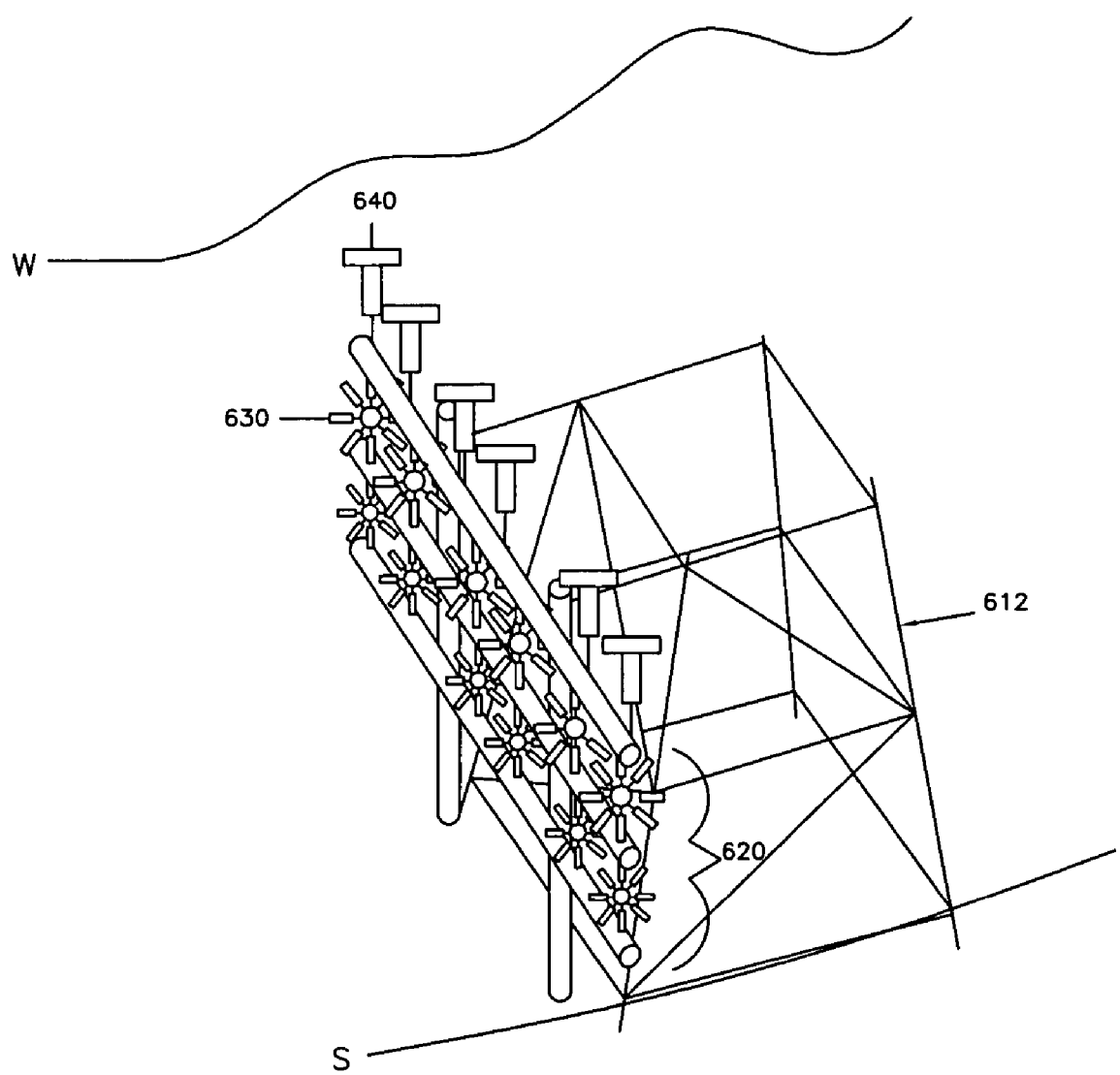
FIG. 9 is a perspective view of an alternative embodiment of an offshore power generator having current generators and wave generators in accordance with the present invention.

FIG. 9 depicts an alternative embodiment of the offshore power generator with only the top of the wave generator above the water's surface W, minimizing visual pollution.

FIGS. 10a and 10b depict an alternative embodiment of an offshore power generator 700. The offshore power generator 700 is substantially similar to the submerged portion of the offshore power generator 600 of FIG. 9. The offshore power generator 700 includes an offshore oil platform 710 mounted to the seabed S and submerged beneath the surface of the water. A support frame 720 is mounted to the offshore platform 710 and includes vertical support members 713 mounted to the seabed S and horizontal support members 712. In a preferred embodiment of the present invention, the horizontal support members 712 are mounted generally perpendicularly to the vertical support members 713, however, the horizontal support members 712 may be attached in any way known to one of ordinary skill in the art. Current generators 720 are mounted to the horizontal support members 712 to generate electricity from water current. The current generators 730 are substantially structurally similar to, and operate substantially similarly to the current generators 30. Mounted to the top of the topmost portion of the offshore platform are horizontal support members 732 with a series of cross support beams 735 upon which wave generators 740 are mounted. The wave generators 740 are substantially structurally similar to, and operate substantially similarly to the wave generators 40. Power cables (not shown) can be electrically connected to the current generators 730, and to the wave generators 740 to transfer the electrical energy from the current generators 730 and the wave generators 740 for consumption, for example, via a power grid (not shown). In a preferred embodiment of the present invention, the wave generators 740 generate electricity independent of the current generators 730.

Figure 11:
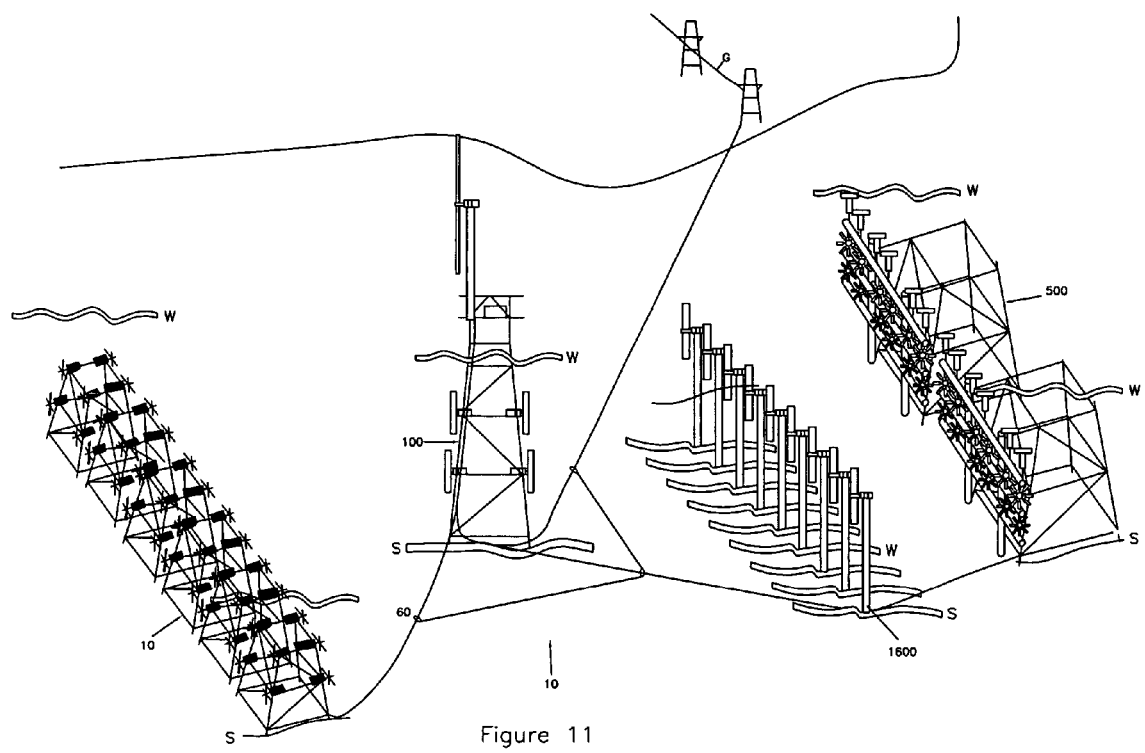
FIG. 11 is a schematic representation of an ocean generation station.

FIG. 11 represents a typical arrangement of offshore power generators such as 10, 100, and 500 all interconnected to the power cables 60 and to the power grid G onshore. In addition to the offshore power generators, alternative energy generators 1600 may be added to the arrangement to provide additional energy production along side the offshore power generators. In a preferred embodiment of the present invention, the alternative energy generators 1600 are wind power generators, however, any alternative energy generators known to one of ordinary skill in the art may be used. Furthermore, although only offshore power generator embodiments 10, 100, and 500 are depicted in FIG. 11, any combination of any of the embodiments of the offshore power generators may be used.

Figure 12:
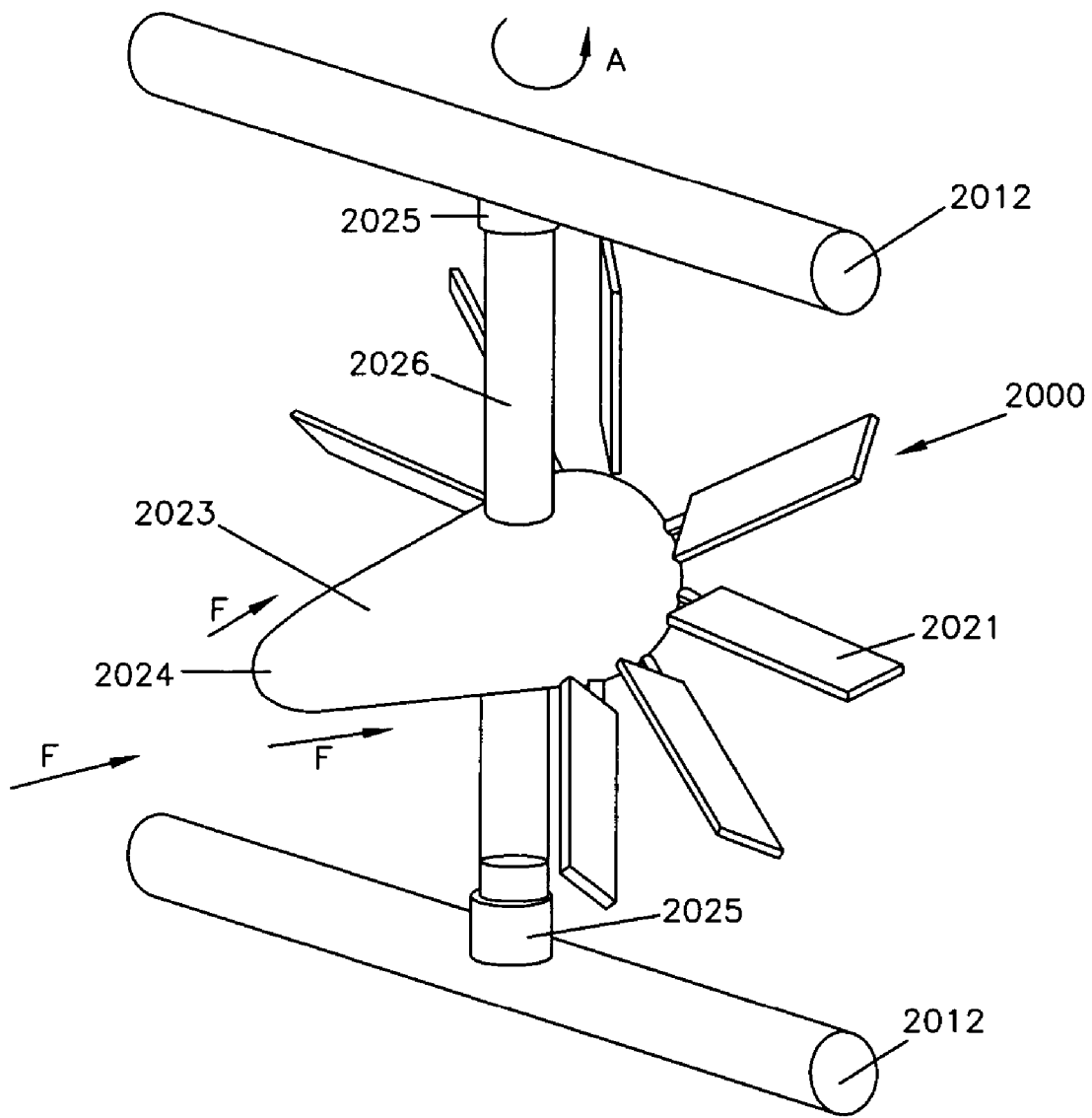
FIG. 12 is a perspective view of an alternative embodiment of a current generator.
Figure 13:
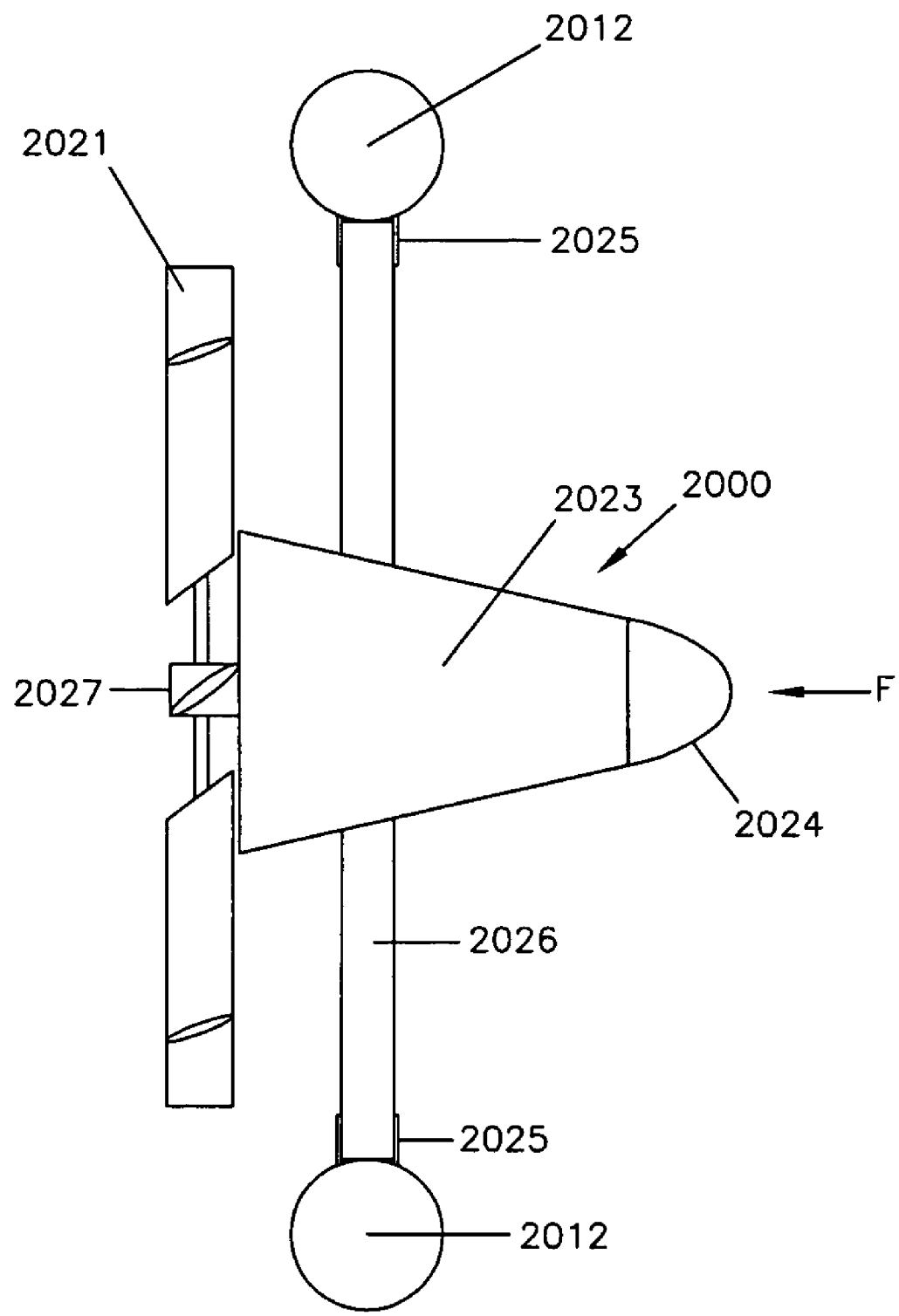
FIG. 13 is a side elevation view of the current generator of FIG. 12.

FIGS. 12 and 13 depict an alternative embodiment of a current generator 2000. The current generator 2000 includes blades 2021 mounted to a shaft 2027. The current generator, in a preferred embodiment, is mounted to a horizontal support frame 2012.

When the blades 2021 are rotated by the current flow F, the blades 2021 turn the shaft 2027 which generates power. An extension shaft 2026 is mounted to the generator 2000 and proceeds generally perpendicularly outward therethrough. The extension shaft 2026 is attached to the horizontal support frame 2012. Disposed on the extension shaft 2026 proximate the horizontal support frame 2012 are electrical contactors 2025. The electrical contactors 2025 are electrically connected to power cables 60 to transfer the electricity generated by the generators 2000 to a power grid (not shown). The generator 2000 is pivotally mounted to the extension shaft 2026 so as to allow the generator 2000 to pivot about its axis in the direction of the arc A, or in the opposite direction to arc A.

A cone 2023 is disposed around the shaft 2027 of the generator 2000 to direct current flow F onto the blades 2021. The cone 2023 includes a nose section 2024 to direct current flow F outward toward the blades 2021. In a preferred embodiment of the present invention, the cone 2023 responds to current flow F in order to align with the current flow F, similar to a weathervane. As the cone 2023 weathervanes to align with the current flow F, the shaft 2026 causes the generator 2000 to pivot about its axis. Furthermore, the current flow F causes the plurality of blades 2021 to rotate the shaft 2027, which in turn operates the generator 2000 to generate electricity.

Figure 14:
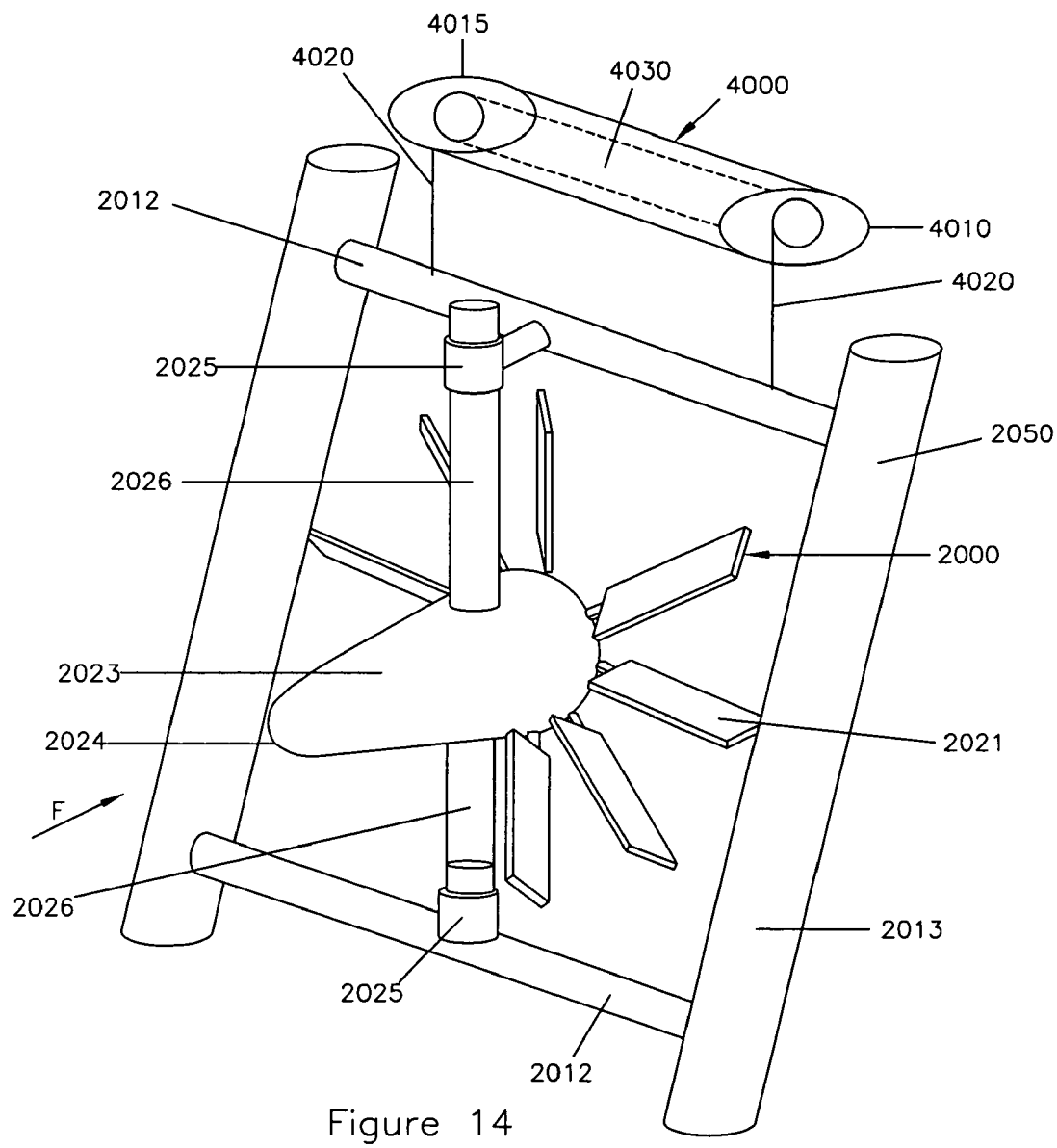
FIG. 14 is a perspective view of an alternative embodiment of a current generator including an alternative embodiment of a wave generator.

FIG. 14 depicts an alternative arrangement of the current generator 2000 that includes the addition of a wave generator 4000. The current generator 2000 and the wave generator are mounted to a frame 2050, which includes vertical support members 2013 and the horizontal support members 2012 disposed substantially perpendicularly to the vertical support members 2013.

The wave generator 4000 includes a buoy 4010, a pair of anchor cables 4020, a generator 4030, and a pair of pulleys 4015 disposed at either end of the buoy 4010.

The buoy 4010 floats on the surface of the ocean and rises and falls as the waves rise and fall. The anchor cables 4020 are connected to the pulley 4015 at one end and to the uppermost horizontal support member 2012 of the support frame 2050. The generator 4030 is operatively attached to the pulleys 4015 and turns when the pulleys 4015 turn to generate electricity.

Figure 15:
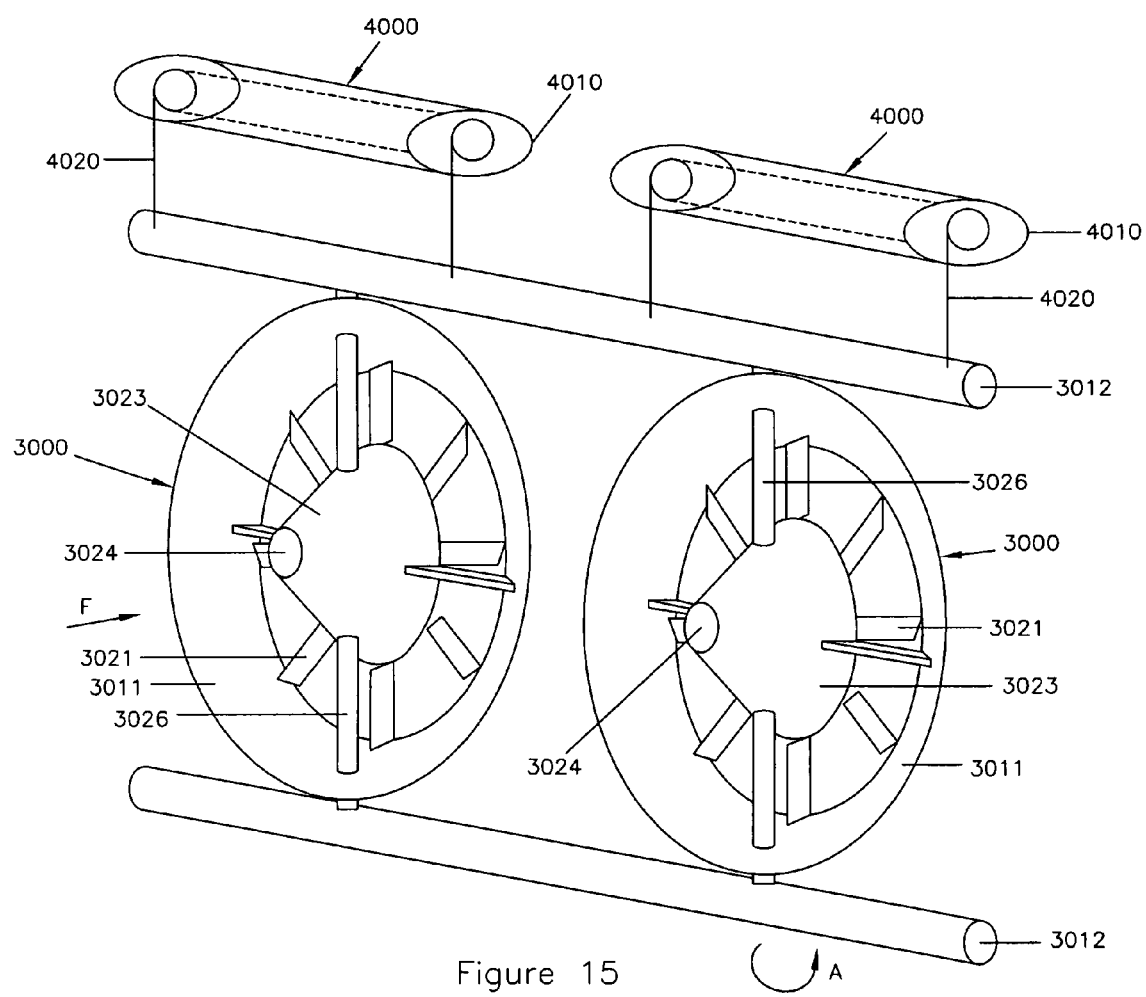
FIG. 15 is a perspective view of an alternative embodiment of a current generator having a perimeter cone.
Figure 16:
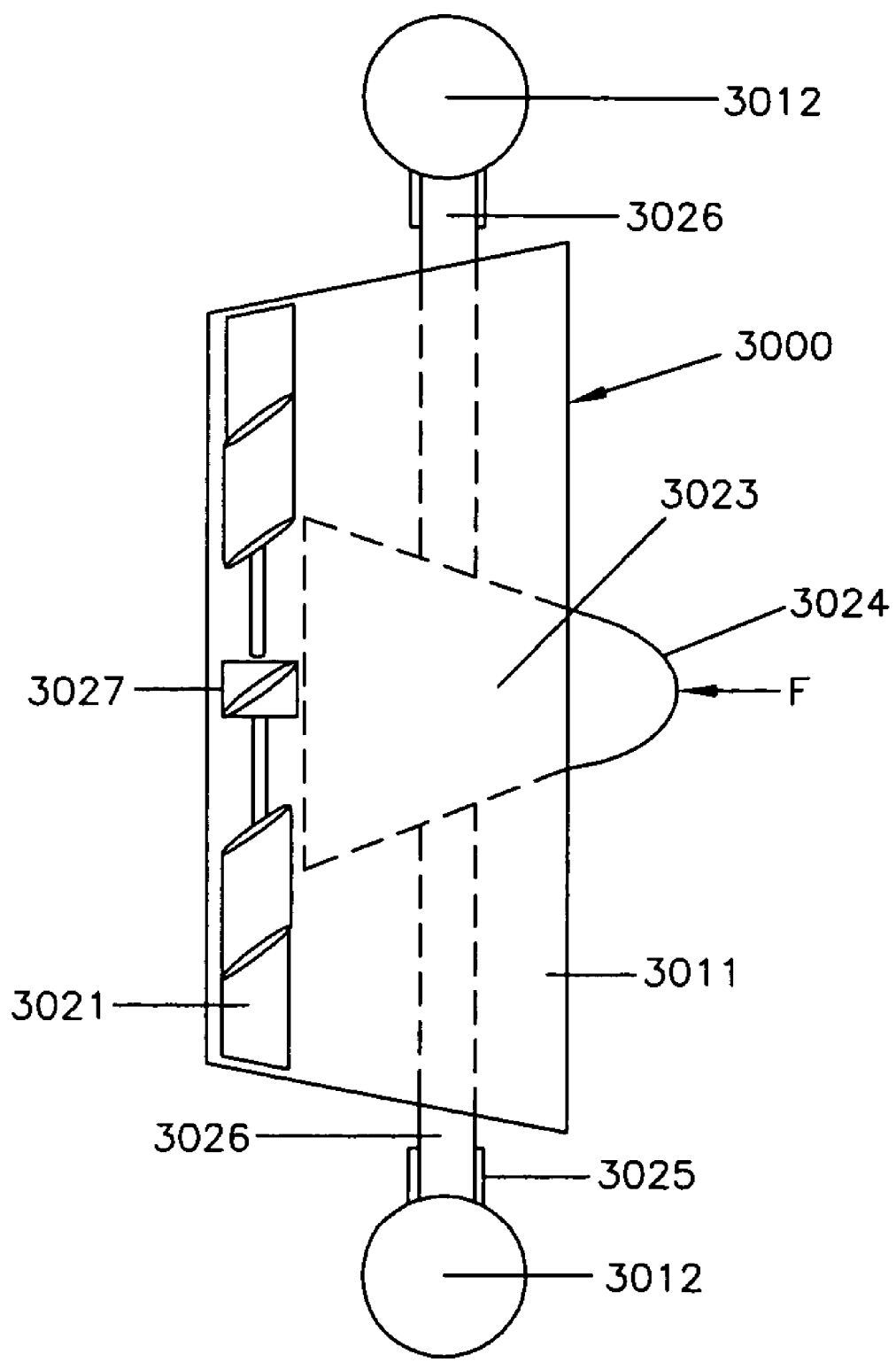
FIG. 16 is a side elevation view of an alternative embodiment of a current generator having a perimeter cone as depicted in FIG. 15.

FIGS. 15 and 16 depict an alternative embodiment of a current generator 3000. The current generator 3000 includes blades 3021 mounted to a shaft 3027. The current generator 3000, in a preferred embodiment, is mounted to a horizontal support frame 3012.

When the blades 3021 are rotated by the current flow F, the blades 3021 turn the shaft 3027 which generates power. An extension shaft 2026 is mounted to the generator 3000 and proceeds generally perpendicularly outward therethrough. The extension shaft 3026 is attached to the horizontal support frame 3012. Disposed on the extension shaft 3026 proximate the horizontal support frame 3012 are electrical contactors 3025. The electrical contactors 3025 are electrically connected to power cables to transfer the electricity generated by the generators 3000 to a power grid (not shown). The generator 3000 is pivotally mounted to the extension shaft 3026 so as to allow the generator 3000 to pivot about its axis in the direction of the arc A, or in the opposite direction to arc A.

A cone 3023 is disposed around the shaft 3027 of the generator 3000 to direct current flow F onto the blades 3021. Cone 3023 comprises a hub with a downstream end at blades 3021. The cone 3023 includes an upstream nose section 3024 to direct current flow F outward toward the blades 3021. In a preferred embodiment of the present invention, the cone 3023 responds to current flow F in order to align with the current flow F, similar to a weathervane. As the cone 3023 weathervanes to align with the current flow F, the shaft 3026 causes the generator 3000 to pivot about its axis. Furthermore, the current flow F causes the plurality of blades 3021 to rotate the shaft 3027, which in turn operates the generator 3000 to generate electricity.

A shroud 3011 is disposed upon the extension shaft 3026 and proceeds substantially circumferentially around the blades 3021. The shroud 3011 diverts current flow F on the outer edges of the blades 3021 toward the blades 3021. A plurality of wave generators 4000 may be mounted to the uppermost horizontal support member 3012.

In a preferred embodiment of the present invention, the wave generators and their components described herein are substantially similar to the wave generators described in U.S. patent application "Ocean Wave Generator" having a Ser. No. 11/142,145 filed Jun. 1, 2005 by Donald H. Gehring, which is incorporated herein in its entirety. Similarly, the current generators, and their components described herein are substantially similar to the current generators described in U.S. patent application "Current Power Generator" having a Ser. No. 11/132,489 filed on May 19, 2005 by Donald H. Gehring and incorporated herein in its entirety.

In view of the foregoing disclosure, some advantages of the present invention can be seen. For example, a novel offshore power generator is provided. The novel offshore power generator utilizes new, existing, abandoned, removed, dumped or relocated fixed or floating offshore platforms as energy generators.

While the preferred embodiment of the present invention has been described and illustrated, modifications may be made by one of ordinary skill in the art without departing from the scope and spirit of the invention as defined in the appended claims.

What is claimed is:

1. A current generator, comprising:
   a support frame;
   a generator mounted to the support frame, including a rotatable shaft, operatively connected to the generator such that when the shaft rotates, the generator generates electricity;
   a plurality of blades mounted to the rotatable shaft, capable of rotation in response to water current;
   an extension shaft, mounted to the generator and pivotally mounted to the support frame;
   a cone disposed upon the generator generally axially about the shaft to direct current flow to the outer edges of the plurality of blades;
   a power cable in electrical communication with the generator; and
   a wave generator mounted to the support frame, said wave generator comprising a buoy, a pair of pulleys disposed at either end of the buoy operatively connected to a generator disposed within the buoy, a pair of anchor cables mounted at one end to the support frame and at the other end to the pulleys to turn the pulleys, which in turn rotate the generator to generate electricity.

2. The current generator of claim 1, further comprising a shroud, mounted to the extension shaft and disposed substantially circumferentially about the outer edges of the plurality of blades.

* * * * *